United States Patent
Groom

(10) Patent No.: US 8,950,751 B2
(45) Date of Patent: Feb. 10, 2015

(54) COMPLIANT ELEMENT

(75) Inventor: Alec R. Groom, Bristol (GB)

(73) Assignee: Rolls-Royce PLC, London (GB)

( * ) Notice: Subject to any disclaimer, the term of this patent is extended or adjusted under 35 U.S.C. 154(b) by 718 days.

(21) Appl. No.: 12/815,885

(22) Filed: Jun. 15, 2010

(65) Prior Publication Data

US 2010/0320701 A1  Dec. 23, 2010

(30) Foreign Application Priority Data

Jun. 18, 2009  (GB) .................................. 0910536.2

(51) Int. Cl.
*E21B 33/00* (2006.01)
*F16J 15/08* (2006.01)
*F01D 11/02* (2006.01)

(52) U.S. Cl.
CPC ........... *F16J 15/0887* (2013.01); *F01D 11/025* (2013.01); *F05D 2250/70* (2013.01)
USPC .......................................... 277/323; 277/322

(58) Field of Classification Search
USPC ................................................. 277/322, 323
See application file for complete search history.

(56) References Cited

U.S. PATENT DOCUMENTS

| | | | |
|---|---|---|---|
| 2,171,185 A * | 8/1939 | Maier ............................ | 267/217 |
| 4,482,086 A * | 11/1984 | Wagner et al. ................ | 277/337 |
| 4,854,600 A | 8/1989 | Halling et al. | |
| 4,958,101 A * | 9/1990 | Takahashi et al. ............ | 310/328 |
| 6,896,049 B2 * | 5/2005 | Moyes .......................... | 166/82.1 |
| 7,134,506 B2 * | 11/2006 | Moyes .......................... | 166/387 |
| 7,564,175 B2 * | 7/2009 | Stier et al. ..................... | 310/348 |
| 2006/0113870 A1* | 6/2006 | Kienzler et al. .............. | 310/328 |
| 2006/0186602 A1* | 8/2006 | Martin et al. ................. | 277/338 |
| 2008/0106046 A1 | 5/2008 | Datta et al. | |
| 2010/0102147 A1 | 4/2010 | Uhlmann et al. | |

FOREIGN PATENT DOCUMENTS

| | | |
|---|---|---|
| DE | 10 2007 012 302 A1 | 9/2008 |
| EP | 0 472 324 A2 | 2/1992 |
| FR | 2 866 090 A1 | 8/2005 |
| GB | 2 210 939 A | 6/1989 |

OTHER PUBLICATIONS

Search Report issued in British Patent Application No. 0910536.2, on Oct. 2, 2009.
European Search Report issued in European Patent Appln. No. EP 10 25 1087; dated Oct. 1, 2010.

* cited by examiner

*Primary Examiner* — Gilbert Lee
(74) *Attorney, Agent, or Firm* — Oliff PLC

(57) ABSTRACT

A compliant element has first and second sections which are separated by a gap. The first and second sections have respective surfaces opposing each other across the gap. The first and second sections are interconnected by flexure elements which are integral with the first and second sections and which extend across the gap. At least part of each flexure element extends obliquely across the gap. Movement of the sections towards and away from each other is accompanied by flexing of the flexure elements.

12 Claims, 3 Drawing Sheets

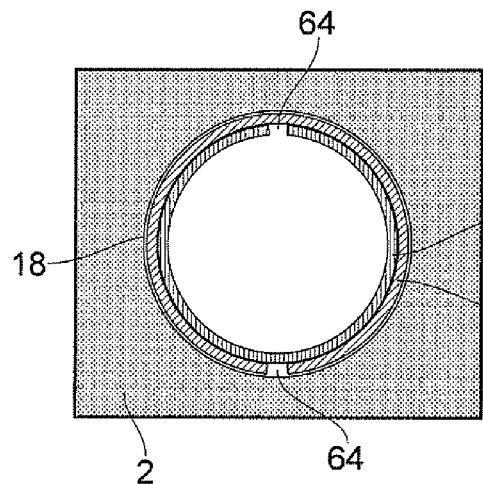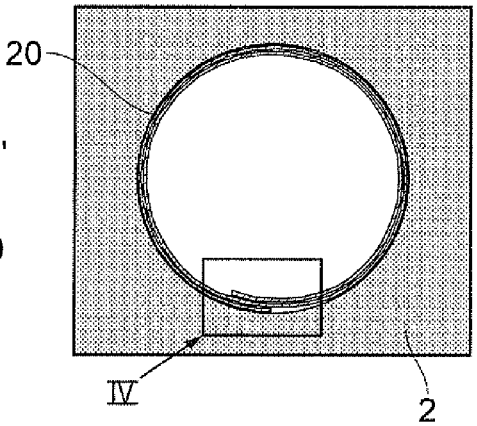
FIG. 4  FIG. 5
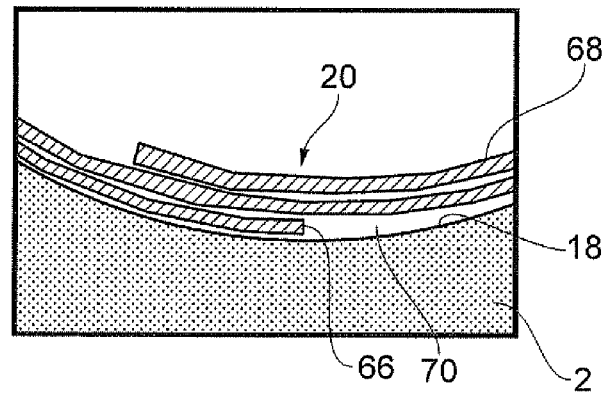
FIG. 6
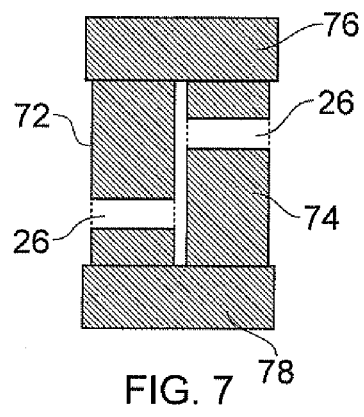
FIG. 7

COMPLIANT ELEMENT

This invention relates to a compliant element. Such an element may be used for a variety of purposes, for example as a seal or as a component of a compliant structure.

It is known to construct compliant elements such as seals from a resilient material such as an elastomer, which is capable of deflecting under load. Consequently, a seal of this kind can be compressed between surfaces to be sealed to provide an adequate sealing effect, while enabling the seal to vary in thickness to accommodate changes in the distance between the sealing surfaces.

Such materials are generally incapable of withstanding high temperatures, and so are not suitable for use in high-temperature environments, as are found in gas turbine engines.

For high-temperature duty, it is known to employ high temperature alloys or ceramics having a profile which permits flexing, for example a C-shaped profile or a i-shaped profile. These profiles will allow the seal to contract and expand to accommodate changes in the distance between the sealing surfaces. However, if the seal is annular, such a profile dictates a minimum radial thickness of the seal. This can sometimes be a disadvantage, for example if the outer diameter of the seal is dictated by external factors, and the inner diameter is required to be as large as possible to provide a maximum volume within the seal.

According to the present invention, there is provided a compliant element comprising a body having first and second sections which are separated by a gap and which are interconnected by flexure elements which are integral with the first and second sections and which extend across the gap, at least part of each flexure element extending obliquely of the perpendicular direction across the gap, whereby movement of the sections towards and away from each other is accompanied by flexing of the flexure elements, whereby the compliant element is a sheet-form element, and the first and second sections have cooperating surfaces at the gap which extend transversely of the lengthwise direction of the gap.

The compliant element is of sheet-form. In the context of this specification, "sheet-form" means that the element has a substantial area in a two-dimensional plane, and a relatively small dimension, or thickness, in the direction perpendicular to the two-dimensional plane. For example, a sheet-form element can be considered to be one in which the minimum transverse dimension of the two-dimensional area is not less than four times the thickness. The expression "sheet-form" also implies a generally uniform thickness over the full extent of the element. The gap may be disposed in the sheet-form element so that the perpendicular direction across the gap and the lengthwise extent of the gap are both perpendicular to the thickness of the element.

The first and second sections may have cooperating surfaces at the gap which contact one another to prevent or limit relative displacement between the first and second sections in the lengthwise direction of the gap. It will be appreciated that the gap, while having a general lengthwise direction, need not be precisely parallel to this direction at all positions along the gap. Thus, the perpendicular direction across the gap is considered to be the direction perpendicular to the lengthwise direction of the gap and relates to the magnitude of the relative distance over which the first and second sections can travel towards each other before the gap is closed.

The cooperating surfaces of the first and second sections may extend parallel to the perpendicular direction across the gap, in order to prevent relative transverse displacement, in the lengthwise direction of the gap, between the first and second sections. Each flexure element may adjoin the first and second sections at respective locations which are spaced apart in the lengthwise direction of the gap.

The compliant element may be of annular form, with the gap extending circumferentially around the compliant element. In such a case, the compliant element may be radially resilient, and the compliant element may be circumferentially split for this purpose.

In one embodiment, a compliant unit is provided which comprises two sheet-formed compliant elements as defined above which are disposed in face-to-face opposition with each other with the respective gaps out of register with each other. Consequently, each gap, along substantially all of its length, is exposed to the first or second section of the other compliant element and does not coincide with the gap of the other element. In some embodiments, the gap of one of the elements may cross the gap of the other element at two or more locations, but, over the main extent of the elements, the gaps will not coincide.

The two compliant elements may extend between common connecting elements, in which case the compliant elements and the common connecting elements may be formed integrally with one another.

In an alternative embodiment, an annular compliant element may be coiled on itself, with adjacent coils being disposed in face-to-face opposition to each other with the gaps of adjacent coils being out of register with each other as referred to above. In such an embodiment, the compliant element may extend around an arc of at least 720°, ie two coils.

Another aspect of the present invention provides a seal comprising a compliant element or a compliant unit as defined above.

A further aspect of the present invention provides an assembly comprising a panel component have an aperture accommodating a seal comprising an annular compliant element or a compliant unit as defined above, the seal being a snug fit within the aperture and axial ends of the seal abutting respective surfaces on opposite sides of the panel component so that the seal is compressed between the surfaces, the spacing between the surfaces being greater than the thickness of the panel component. A connecting element may extend through the aperture between the surfaces, the seal surrounding the connecting element with a clearance.

In one particular embodiment, the panel component may be a liner in a gas turbine engine.

Another aspect of the present invention provides a partitioned compliant structure, having a plurality of partitions which comprise compliant elements as defined above. The compliant elements may be arranged in the form of a grid, and the grid may be disposed between skins. Such an embodiment may thus provide a structure which is compliant in the direction between the skins, but is relatively stiff in directions parallel to the skins.

In an alternative form, the partitioned compliant structure may be of arcuate or annular form, with a first group of the compliant elements extending in planes that are radial with respect to the axis of the structure and a second group of the compliant elements extending in planes transverse to the axis, whereby the structure is radially compliant with respect to the axis of the structure.

For a better understanding of the present invention, and to show more clearly how it may be carried into effect, reference will now be made, by way of example, to the accompanying drawings, in which:—

FIG. 4 is a sectional view of an alternative embodiment taken on the line IV-IV in FIG. 1;

Figure 8:
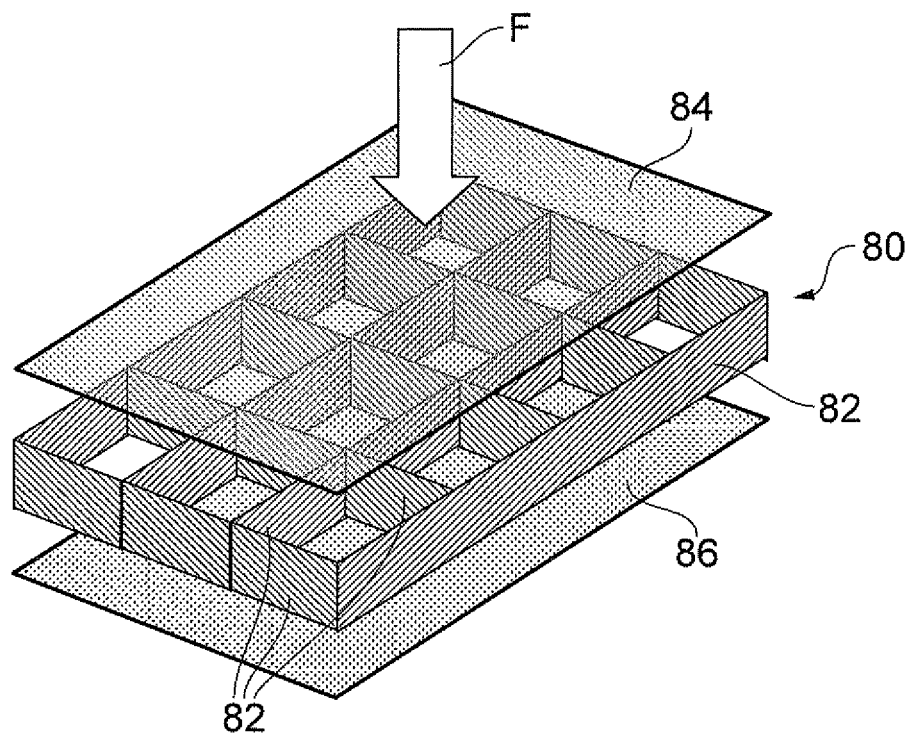

FIG. 5 corresponds to FIG. 4 but shows a third variant;

FIG. 6 is an enlarged view of the region indicated by a rectangle VI in FIG. 5;

FIG. 7 is a sectional view of a further embodiment of the seal;

FIG. 8 is an exploded view of a partitioned compliant structure; and

Figure 9:
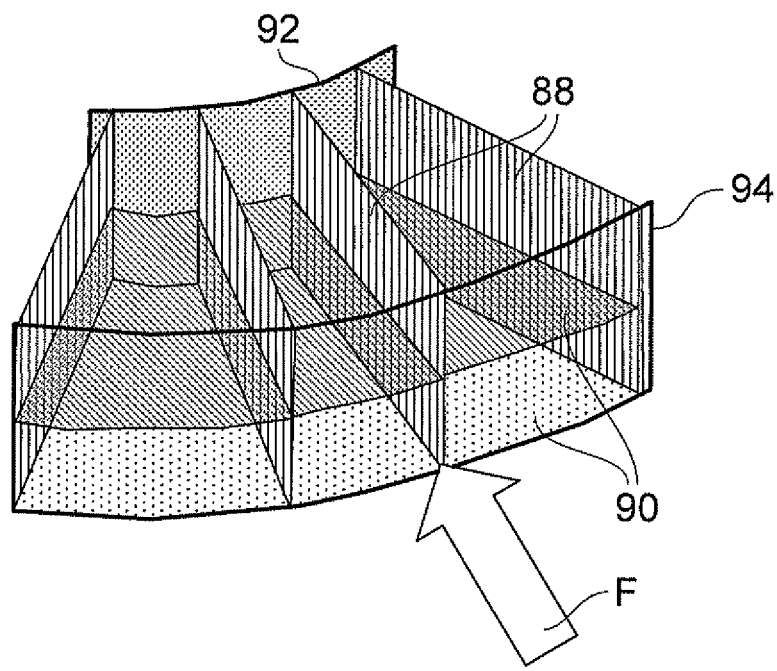

FIG. 9 shows an alternative partitioned compliant structure.

Figure 1:
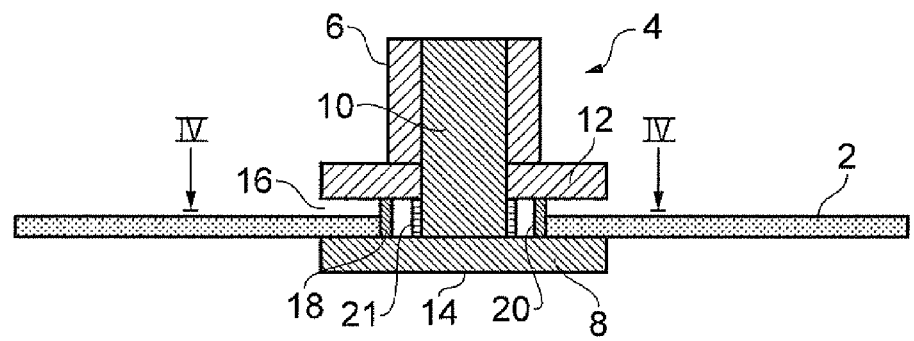
FIG. 1 is a sectional view of a support arrangement for a liner in a gas turbine engine.

FIG. 1 shows a liner panel 2 supported by a mounting assembly 4. The mounting assembly 4 comprises a first component 6 and a second component 8 which are connected together by means of a connecting element 10 which is part of the second component 8 and is secured, for example by means of a screwthread, in a bore of the first component 6.

The first and second components 6, 8 are provided with flanges 12, 14 which are spaced apart to provide an annular groove 16 which receives the liner 2. The liner 2 has an aperture 18 which surrounds the connecting element 10 with clearance.

The liner is supported by the mounting assembly 4 in such a manner that it is free to move both radially and axially with respect to the lengthwise direction of the connecting element 10. Thus, the thickness of the liner 2 is less than the width of the gap 16, and the aperture 18 is larger than the outer dimension of the connecting element 10. Such movement is necessary in order to enable the liner 2 and the mounting assembly 4 to accommodate differential thermal expansion.

In order to prevent gas leakage through the aperture 18, a seal 20 is provided which is a snug fit in the aperture 18 and fits closely in the groove 16 between the flanges 12 and 14.

Typically, the width of the gap 16 is of the order of 3 mm. Manufacturing tolerances can result in this width being variable, by up to 20%, and the axial length, or height, of the seal 20 can also vary by up to 10%. Consequently, it is necessary for the seal 20 to be compliant in the axial direction so that it can be compressed to fit within the gap 16, without losing the snug fit with the aperture 18.

Furthermore, liners in gas turbine engines are subject to very high temperatures, and it is therefore necessary for the seal 20 to be made from a material which can withstand such temperatures, such as a high temperature alloy or a ceramic.

In order to provide substantial freedom of movement of the liner 2 relatively to the connecting element 10 in the radial direction, it is necessary for the seal 20 to be relatively thin, in order to provide the maximum possible inside diameter for a given outside diameter (ie the dimension of the aperture 18).

It is also necessary to minimise friction between the seal 20 and flanges 12,14 to provide freedom of movement. This can be achieved by ensuring that the clamping force exerted on the seal 20 when in place between the first component 6 and second component 8 is limited to a value which maintains the resultant frictional force between the seal 20 and first and second components 6,8 to at a value which permits freedom of movement.

A collar 21 may be provided between the flanges 12,14 which is clamped between the first component 6 and second component 8. The height of the collar 21 dictates the extent to which the seal 20 is compressed.

Figure 2:
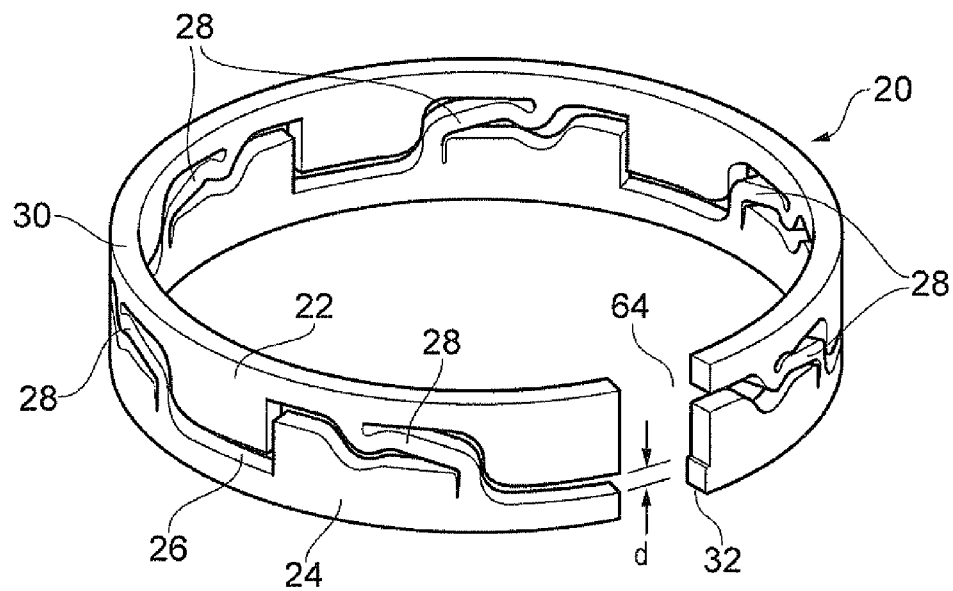
FIG. 2 shows a seal of the arrangement of FIG. 1.

In order to meet its operation requirements, the seal 20 is constructed as shown in FIG. 2. As shown in FIG. 2, the seal is circular, in order to fit in a circular aperture 18, but other shapes may be desirable in some circumstances.

The seal 20 is made from a sheet-form material curved into a circular shape. That is to say, the seal 20 is flat (ie straight sided) in a two dimensional plane and arcuate in a direction perpendicular to the two-dimensional plane. The seal 20 comprises a first section 22 and a second section 24 which are separated by a gap 26. Flexure elements 28 extend across the gap 26 between the first and second sections 22, 24. The seal 20 has axial end faces 30, 32, provided respectively on the first and second sections 22, 24. Axial compression applied between the sealing faces 30, 32, by the flanges 12, 14 causes the seal 20 to be compressed, the flexure elements 28 then flexing so that the gap 26 is partially closed. That is to say, the first component 6 and second component 8 are clamped together with sufficient distance between the flange 12 and flange 14 such that the seal 20 is partially compressed, thereby reducing the gap 26 to less than it would be if the seal 20 was not under compression. Alternatively compression may be applied between the sealing faces 30, 32 so that the gap 26 is completely closed. If a collar 21 is provided between the flanges 12,14, the height of the collar 21 will dictate the extent to which the seal 20 is compressed.

It will be appreciated that, in this specification, the reference to the "gap" 26 refers to the axial separation d shown in FIG. 2 representing the axial distance over which the sections 22, 24 can travel towards each other. As will be discussed below, the gap 26 is not straight, and consequently some regions of the first and second sections 22, 24 are closer together than the distance d or even in contact with each other.

Figure 3:
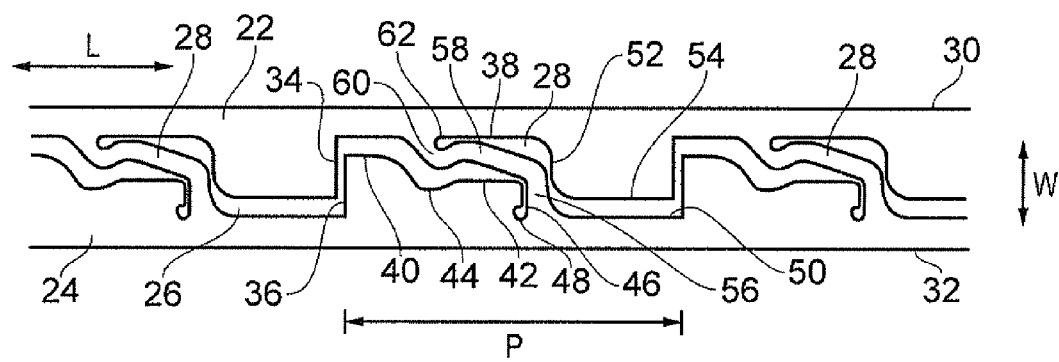
FIG. 3 is a projected view of the seal of FIG. 2.

The configuration of the gap 26 is shown in FIG. 3. In FIG. 3, the general lengthwise direction of the gap is indicated by an arrow L, and it will be appreciated that this direction L is the circumferential direction in the annular configuration of the seal 20 shown in FIG. 2. The perpendicular direction across the gap, or transverse direction, is indicated by an arrow W. It will be appreciated that the profile of the gap repeats in the direction L at a pitch P. Starting from the left-hand end of the pitch P shown in FIG. 3, the first and second sections 22, 24 have oppositely disposed surfaces 34, 36 which extend in the transverse direction W. These faces 34, 36 are relatively close to each other, and may be in contact.

From the transverse surface 34, the surface of the first section 22 extends in the lengthwise direction L as a surface 38 from which the flexure element 28 extends. The opposite surface of the second section 24 also extends from the transverse surface 36 in the lengthwise direction, as two step surfaces 40, 42 which are interconnected by a depression 44. The surface 42 adjoins a further transverse surface 46 which adjoins the flexure element 28 at a stress-relieving radius 48. From the flexure element 28, the second section 24 extends in the lengthwise direction along a surface 50.

The first section 22 extends from the lengthwise surface 38 to a transverse surface 52 and thence to a lengthwise surface 54 through respective radiused transitions.

The flexure element 28 has a first portion 56 extending in the transverse direction W from the surface 50 of the second section 24, followed by an oblique portion 58 which is connected by a section 60 which curves first towards the second portion 24 and then back to adjoin the first portion 22 at the lengthwise surface 38. This configuration leaves a radiused transition 62 between the flexure element 28 and the lengthwise surface 38 of the first section 22.

The configuration described above results in the flexure element 28 being connected to the respective first and second sections 22, 24 at positions which are spaced apart in the lengthwise direction L. Consequently, relative displacement between the sections 22, 24 in the transverse direction W is accompanied by flexure of the flexure element 28 in a bending mode. The radiused transitions 48, 62 avoid stress concentrations at the junctions between the flexure element 28 and the first and second sections 22, 24. The depression 44 provides space to accommodate the curved portion 60 of the flexure element 28 when the seal 20 is fully depressed.

As can be seen from FIG. 2, the seal 20 is circumferentially split at 64, with the result that the seal 20 is radially resilient. Consequently, the seal 20 can be radially compressed to place it within the aperture 18 of the liner 2 so that, under its own resilience, it maintains a snug fit within the aperture 18. Also, it will be appreciated that the axial resilience of the seal 20, provided by the configuration described with reference to FIG. 3, ensures that the axial thickness of the seal 20, in the transverse direction W, will adapt to the spacing between the flanges 12, 14. The seal 20 thus provides adequate sealing across the two sides of the liner 2, while enabling the liner 2 to move both axially and radially with respect to the connecting element 10 under thermal, pressure and other effects.

There will nevertheless be some leakage across the seal 20 through the gap 26. This can be minimised by the measure illustrated in FIG. 4, in which the seal 20 is used with an additional inner seal 20' of generally the same configuration as the seal 20, but with a smaller diameter. The inner seal 20' may be placed "upside down" relative to the outer seal 20, and the seals 20, 20' may be rotated slightly relatively to each other in order to place the respective gaps 26 out of register with each other, minimising the leakage path through aligned regions of the gaps 26 in the radial direction.

The seals 20 and 20' may be made by laser or water cutting the gap configuration as shown in FIG. 3 from a flat sheet or strip, the strip then being rolled to the required diameter and the circumferential splits 64 formed. The unstressed diameters of the seals 20 and 20' will be slightly oversized so that, when the outer seal 20 is inserted into the aperture 18, it springs lightly into contact with the edge of the aperture 18, and similarly the inner seal 20' springs lightly into contact with the inner surface of the outer seal 20. The splits 64 should, of course, be minimised in order to minimise leakage through them and disposed out of alignment with each other.

An alternative configuration is shown in FIG. 5. Instead of utilising two seals 20, 20' a single seal 20 is provided. The seal 20 is coiled at least twice (ie around more than) 720° so that there are at least two coils around the edge of the aperture 18. By suitable control of the pitch P (FIG. 3) it can be arranged that the gaps 26 of adjacent coils are out of register with each other, so as to minimise leakage through the gaps 26 as described above. Thus, whereas the seals 20, 20' are formed from strips having a length corresponding approximately to their circumferential extent when rolled into the annular configuration, the seal 20 of FIG. 5 is formed from a strip having a length at least double the circumferential extent around the aperture 18. The strip is then rolled to form a spiral in the manner of a "clock spring", with slight over-sizing to ensure that it expands when installed to fit snugly against the edge of the aperture 18.

As shown in FIG. 6, the outer edge 66 of the strip 68 from which the seal 20 is formed causes a space 70 to be left adjacent the edge of the aperture 18. This space 70 can be minimised by using relatively thin strip 68, or alternatively by suitably profiling the edge of the aperture 18, for example to provide a step corresponding to the edge 66, by a suitable means such as laser or water cutting.

In either of the embodiments of FIGS. 4 to 6, the strip can be rolled into a plane ring, or into a gentle helix. Such a helix with have sufficient compliance to squash down to a plane ring so as to fit snugly between the flanges 12, 14.

FIG. 7 shows an alternative embodiment, in which inner and outer compliant units 72, 74, each corresponding to the inner and outer seals 20', 20 of the embodiment of FIG. 4, are integrated into a common seal, with common connecting elements 76, 78. The entire seal may be formed as an integral or monolithic structure, with the gaps 26 providing the required resilience for fitting between the flanges 12, 14. As with the seal 20 of FIG. 2, the seal of FIG. 7 may be of annular form, provided with a circumferential split 64. A seal of the form shown in FIG. 7 may be made by a stereolithographic process, such as Metal Selective Laser Sintering (MSLS), also known as Direct Laser Deposition (DLD). Such processes can achieve complex shapes with very fine tolerances, and consequently it may be possible to form the seal sufficiently accurately to avoid the need for the circumferential split 64. Such methods may also be used to form the seals 20, 20' as shown FIGS. 2 to 4.

Such stereolithographic processes may require the creation of a support structure for the various elements of the seal, during the building-up process. Such support structures can be removed at the end of the forming process by a suitable machining operation, such as by wire-cutting or electro-discharge machining (EDM).

It will be appreciated that the stiffness of the seals described and the available travel in the axial direction can be tailored to suit any particular application by altering the configuration and dimensions of the compliant features, and in particular of the flexure elements 28. It is possible to tailor the balance between elastic and plastic compliance of the seals 20, 20'. For example, the properties of the material of the seals, or other compliant elements, may be such that a first part of the movement of the first and second sections 22, 24 towards each other is accompanied by elastic deformation of the flexure elements 28, and a second part of the movement, before the gap 26 is fully closed, is accompanied by plastic deformation of the flexure elements 28.

The radial stiffness of the seals 20, 20' can be tailored by altering the thickness of the strip used for their manufacture and by altering the number of rings or coils that are used. Thus, for example, in the embodiments of FIGS. 4 and 7, more than two seals 20, 20' or elements 72, 74 may be employed, and in the embodiment of FIG. 5 more than two coils of the strip 68 may be provided.

While annular seals of circular form have been described with reference to FIGS. 1 to 7, the seals may have other configurations, and need not be of closed form. For example, the seals could be formed as ellipses, straight pieces, L-shapes, etc.

In the embodiment described with reference to FIG. 3, the flexure elements 28 are all formed with the same configuration and dimensions, and so exhibit the same compliant characteristics. However, in some applications, it may be desirable for the seal to exhibit different compliance at different locations, and this can be accomplished by varying the characteristics of the flexure elements 28 along or around the seal.

FIGS. 8 and 9 show alternative structures utilising the compliant features described with reference to FIGS. 1 to 7. Thus, while FIGS. 1 to 7 show seals, compliant sheet-form elements which are compliant in one direction in the plane of the element but are stiff in at least one other direction in that plane, may have various uses.

FIG. 8 shows a partitioned compliant structure comprising a cellular structure 80 formed from a grid of sheet-form compliant elements 82. That is to say, the compliant elements 82 are flat (ie straight sided) in a two dimensional plane. The compliant elements 82 may also be flat (ie straight sided) in a direction perpendicular to the two-dimensional plane. The elements 82 have a gap with flexure elements similar to the gap 26 and flexure elements 28 described with reference to FIG. 3. Consequently, the grid structure 80 is compliant in the direction indicated by an arrow F, but are relatively stiff in in-plane directions perpendicular to the arrow F. Upper and lower skins 84, 86 are bonded, or otherwise secured, to the grid structure 80. These skins 84, 86 have no in-plane compliance. The result is a structure which is compliant in the direction F, but is relatively rigid in other directions.

As an alternative to the grid structure shown in FIG. 8, a partitioned compliant structure of arcuate form can be formed as shown in FIG. 9. FIG. 9 shows a structure extending over a relatively small arc, but it will be appreciated that structures extending over larger arcs, or even around a full circle to form an annular structure, may be constructed. In the embodiment of FIG. 9, radial and transverse partitions 88 and 90 are assembled together with inner and outer skins 92, 94. The partitions 88 and 90 are formed with gap and flexure element configurations as described with reference to FIG. 3, the gaps 26 extending axially between the skins 92 and 94 in the radial partitions 88 and extending circumferentially in the transverse partitions 90.

Consequently, the structure as a whole is compliant in the radial direction, as indicated by the arrow F, but is relatively stiff in the axial direction.

It will be appreciated that, although the seals described with reference to FIGS. 1 to 7 have only a single gap 26 extending circumferentially, it is possible for more than one gap to be provided, to increase the amplitude of the compliant movement.

Structures such as are shown in FIGS. 8 and 9 can be employed for various purposes, for example to allow ease of fitting, as in the fitting of the seals 20, 20' between the flanges 12, 14 in the embodiments of FIGS. 1 to 7, or for impact absorption, for example in vehicle structure and trim, flooring, footwear, and sports equipment. The structures may also be suitable for sound absorption.

Although the seals described in FIGS. 1 to 7 are intended for high-temperature applications, and are consequently made of materials suitable for that purpose, it will be appreciated that other materials, such as plastics, may be suitable in other applications, for example where high-temperature capabilities are not required.

The invention is further set out in the following numbered paragraphs.

1 A compliant element comprising a body having first and second sections which are separated by a gap and which are interconnected by flexure elements which are integral with the first and second sections and which extend across the gap, at least part of each flexure element extending obliquely to the perpendicular direction across the gap whereby movement of the sections towards and away from each other is accompanied by flexing of the flexure elements.

2 A compliant element as described in paragraph 1, which is a sheet-form element.

3 A compliant element as described in paragraph 2, in which the thickness of the element extends perpendicular to the perpendicular direction across the gap and to the lengthwise direction of the gap.

4 A compliant element as described in paragraph 2 or 3, in which the first and second sections have cooperating surfaces at the gap which extend transversely of the lengthwise direction of the gap.

5 A compliant element as described in paragraph 4, in which the cooperating surfaces are parallel to the perpendicular direction across the gap.

6 A compliant element as described in any one of paragraphs 2 to 5, in which each flexure element meets the first and second sections at respective locations which are spaced apart in the lengthwise direction of the gap.

7 A compliant element as described in any one of paragraphs 2 to 6, in which the element is of annular form and in which the gap extends circumferentially of the element.

8 A compliant element as described in paragraph 7, in which the element is radially resilient.

9 A compliant element as described in paragraph 7 or 8, in which the element is circumferentially split.

10 A compliant unit comprising two compliant elements as described in any one of paragraphs 2 to 9, which are disposed in face-to-face opposition with each other with the respective gaps of the elements disposed out of register with each other.

11 A compliant unit as described in paragraph 10, in which the compliant elements extend between common connecting elements, the compliant elements and the connecting elements being formed integrally with each other.

12 A compliant element as described in paragraph 7 or 8, in which the compliant element is in a coiled configuration, adjacent coils being in face-to-face opposition with each other, with the respective gaps of adjacent coils being out of register with each other.

13 A compliant element as described in paragraph 12, which is coiled around at least 720°.

14 A seal comprising a compliant element in accordance with any one of the preceding numbered paragraphs.

15 An assembly comprising a panel component having an aperture accommodating a seal in accordance with paragraph 14 when appendant to paragraph 7, the seal being a snug fit within the aperture and axial ends of the seal abutting respective surfaces on opposite sides of the panel component so that the seal is compressed between the surfaces, the spacing between the surfaces being greater than the thickness of the panel component.

16 An assembly as described in paragraph 15, in which a connecting element extends through the aperture between the surfaces, the seal surrounding the connecting element with clearance.

17 An assembly as described in paragraph 15 or 16, in which the panel component is a liner in a gas turbine engine.

18 A partitioned compliant structure, having a plurality of partitions which comprise compliant elements or compliant units as described in any one of paragraphs 1 to 13.

19 A partitioned compliant structure as described in paragraph 18, in which the compliant elements or compliant units are arranged in the form of a grid.

20 A partitioned compliant structure as described in paragraph 19, in which the grid is disposed between skins.

21 A partitioned compliant structure as described in paragraph 18, in which the structure is of arcuate or annular form, a first group of the compliant elements or compliant units extending in planes that are radial with respect to the axis of the structure and a second group of the compliant elements or the compliant units extending in planes transverse to the axis of the structure, whereby the structure is radially compliant.

The invention claimed is:

1. A compliant element comprising:
a body having a first section and a second section extending in a lengthwise direction of the body, the first section and the second section being separated by a gap and having respective first planar surfaces extending in the lengthwise direction and opposing each other across the gap, the first section and the second section being interconnected by serpentine flexure elements that are integral with the first section and the second section and that extend across the gap, at least part of each flexure element extending obliquely to a perpendicular direction across the gap, wherein movement of the first section and the second section towards and away from each other is accompanied by flexing of the flexure elements, the compliant element is a sheet-form element, the first section and the second section have respective second planar surfaces opposing each other across the gap, the second planar surfaces extending transversely of the lengthwise direction and parallel to the perpendicular direction across the gap.

2. A compliant element as claimed in claim 1 wherein the thickness of the compliant element extends perpendicular to the direction across the gap and to the lengthwise direction.

3. A compliant element as claimed in claim 1, wherein each flexure element meets the first section and the second section at respective locations which are spaced apart in the lengthwise direction.

4. A compliant element as claimed in claim 1, wherein the compliant element has an annular form and the gap extends circumferentially about the element.

5. A compliant element as claimed in claim 4, wherein the compliant element is radially resilient.

6. A compliant element as claimed in claim 4, wherein the compliant element is circumferentially split.

7. A compliant element as claimed in claim 4, wherein the compliant element has a coiled configuration, adjacent coils of the coiled configuration are in face-to-face opposition with each other, and respective gaps of adjacent coils are out of register with each other.

8. A compliant element as claimed in claim 7, wherein the compliant element is coiled around at least 720°.

9. A compliant unit comprising two compliant elements as claimed in claim 1, wherein the two compliant elements are disposed in face-to-face opposition with each other, and respective gaps of the two compliant elements are disposed out of register with each other.

10. A compliant unit as claimed in claim 9, wherein the two compliant elements extend between common connecting elements, and the two compliant elements and the common connecting elements are formed integrally with each other.

11. A compliant element as claimed in claim 1, wherein the compliant element is flat in a two dimensional plane.

12. A compliant element as claimed in claim 11, wherein the compliant element is arcuate in a direction perpendicular to the two-dimensional plane.

* * * * *